United States Patent [19]

Yamagami

[11] Patent Number: 4,823,282

[45] Date of Patent: Apr. 18, 1989

[54] GRAPHIC DISPLAY APPARATUS HAVING BOUNDARY DETECTION TARGET REGION DESIGNATING CIRCUIT

[75] Inventor: Nobuhiko Yamagami, Tachikawa, Japan

[73] Assignee: Kabushiki Kaisha Toshiba, Kawasaki, Japan

[21] Appl. No.: 911,060

[22] Filed: Sep. 24, 1986

[30] Foreign Application Priority Data

Sep. 27, 1985 [JP] Japan ................................ 60-212521

[51] Int. Cl.$^4$ ............................................. G06F 15/72
[52] U.S. Cl. .................................... 364/518; 340/734; 340/747
[58] Field of Search ................. 364/518, 523; 340/724, 340/734, 747

[56] References Cited

U.S. PATENT DOCUMENTS

| | | | |
|---|---|---|---|
| 4,441,104 | 4/1984 | Finney, II | 340/724 |
| 4,594,673 | 6/1986 | Holly | 364/522 |
| 4,622,545 | 11/1986 | Atkinson | 340/747 |
| 4,633,415 | 12/1986 | Vink et al. | 364/521 |
| 4,642,626 | 2/1987 | Bruce | 340/750 |
| 4,642,790 | 2/1987 | Minshull et al. | 364/900 |
| 4,663,617 | 5/1987 | Stockwell | 340/726 |

*Primary Examiner*—Gary V. Harkcom
*Assistant Examiner*—Randy W. Lacasse
*Attorney, Agent, or Firm*—Finnegan, Henderson, Farabow, Garrett, & Dunner

[57] ABSTRACT

A boundary detection target region designating circuit includes a maximum value register in which a predetermined minimum value is initially set, and a minimum value register in which a predetermined maximum value is initially set. The content of the maximum value register is compared with a vertex coordinate of a boundary written in a boundary detection memory by a first comparator. If it is detected that the vertex coordinate is larger than the content of the maximum value register, the content of the maximum value register is updated to be the vertex coordinate by a first updating means. The content of the minimum value register is compared with the vertex coordinate by a second comparator. If it is detected that the vertex coordinate is smaller than the content of the minimum value register, the content of the minimum value register is updated to be the vertex coordinate by a second updating means. After a boundary write operation into the boundary detection memory is completed, maximum and minimum coordinates of a minimum rectangular region including all the boundaries of blanked-out regions are indicated by the maximum and minimum value registers.

7 Claims, 5 Drawing Sheets

GRAPHIC DISPLAY APPARATUS HAVING BOUNDARY DETECTION TARGET REGION DESIGNATING CIRCUIT

BACKGROUND OF THE INVENTION

The present invention relates to a graphic display apparatus having a boundary detection target region designating circuit necessary for boundary detection of a blanking out processing region and having a boundary detection memory in which all the two-dimensional figures corresponding to boundaries of figure blanking out processing are written.

Figure 1:
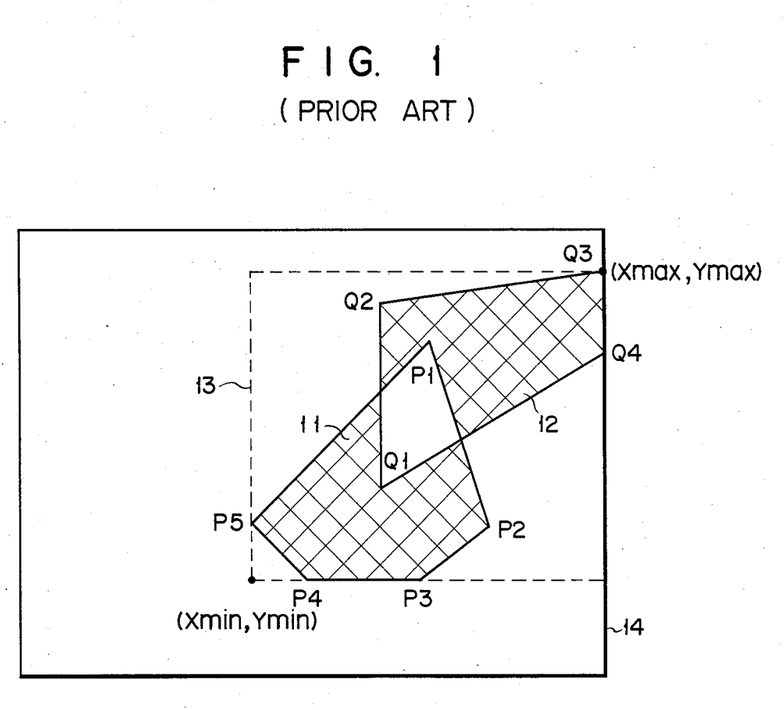
FIG. 1 is a representation showing a display sample of a known blanked-out figure.

A graphic display apparatus having a frame memory for storing figures has a figure processing function for blanking out a region bound by an arbitrary closed figure. The graphic display apparatus of this type has a memory (boundary detection memory) for temporarily storing figures in addition to the frame memory. In blanking out processing, all the two-dimensional figures (closed figures) to be boundaries of regions (target regions for figure blanking out processing) are temporarily written in the boundary detection memory. Thereafter, an operation for detecting a boundary is performed while read accessing all the areas of the boundary detection memory in a scan line direction, and a given blanked-out figure is written in the frame memory in accordance with the boundary detection result. The blanked-out figure, as shown in FIG. 1, is displayed on a screen in accordance with the content of the frame memory. Note that FIG. 1 illustrates a state wherein regions surrounded by closed FIGS. 11 and 12 are blanked out.

Referring to FIG. 1, rectangle 13 indicated by a broken line is a minimum rectangle including all the boundaries of the blanked-out regions. The region of rectangle 13 is normally only a small fraction of display region 14. Therefore, in order to detect the boundary of such a small region, it is time-consuming to read out all the regions of possible display region 14.

SUMMARY OF THE INVENTION

It is an object of the present invention to provide a graphic display apparatus having a boundary detection target region designating circuit which can designate a minimum region as a boundary detection target in boundary detection of a blanking out processing region, and can improve a boundary detection processing speed when compared with conventional boundary detection in which a boundary detection target region is fixed to a possible display region.

In order to achieve the above object, according to the present invention, there is provided a graphic display apparatus having a boundary detection target region designating circuit and having a boundary detection memory in which all the two-dimensional figures to be boundaries of target regions of figure blanking out processing are written, comprising:

a first register in which a predetermined minimum value is set as an initial value;

a second register in which a predetermined maximum value is set as an initial value;

a first comparator for comparing a vertex coordinate of a boundary written in the boundary detection memory with a content of the first register;

first updating means for, when the first comparator detects that the vertex coordinate is larger than the content of the first register, updating the content of the first register to be the vertex coordinate;

a second comparator for comparing the vertex coordinate with a content of the second register; and second updating means for, when the second comparator detects that the vertex coordinate is smaller than the content of the second register, updating the content of the second register to be the vertex coordinate, after a boundary write operation into the boundary detection memory is completed, the contents of the first and second registers indicating maximum and minimum coordinates of a rectangular region to be a boundary detection target.

According to the present invention, in boundary detection of a blanking out processing region, a minimum region as a boundary detection target can be designated. Therefore, unlike conventional boundary detection, boundary detection need not be performed for all the areas of a boundary memory, and the boundary detection processing speed can be improved.

BRIEF DESCRIPTION OF THE DRAWINGS

FIGS. 4A through 4H are timing charts for explaining the operation of the embodiment shown in FIGS. 2 and 3, in which FIG. 4A shows basic clock signal CLK supplied to a boundary processing controller, FIG. 4B shows clear signal CLR supplied to selectors and maximum and minimum value registers, FIG. 4C shows load signal CLKL supplied to the maximum and minimum value registers, FIG. 4D shows vertex coordinate signal Xi, FIG. 4E shows output signal S1 of comparator 44, FIG. 4F shows output signal Xmax of maximum value register 42, FIG. 4G shows output signal S2 of comparator 45, and FIG. 4H shows output signal Xmin of minimum value register 43.

DETAILED DESCRIPTION OF THE PREFERRED EMBODIMENTS

Figure 2:
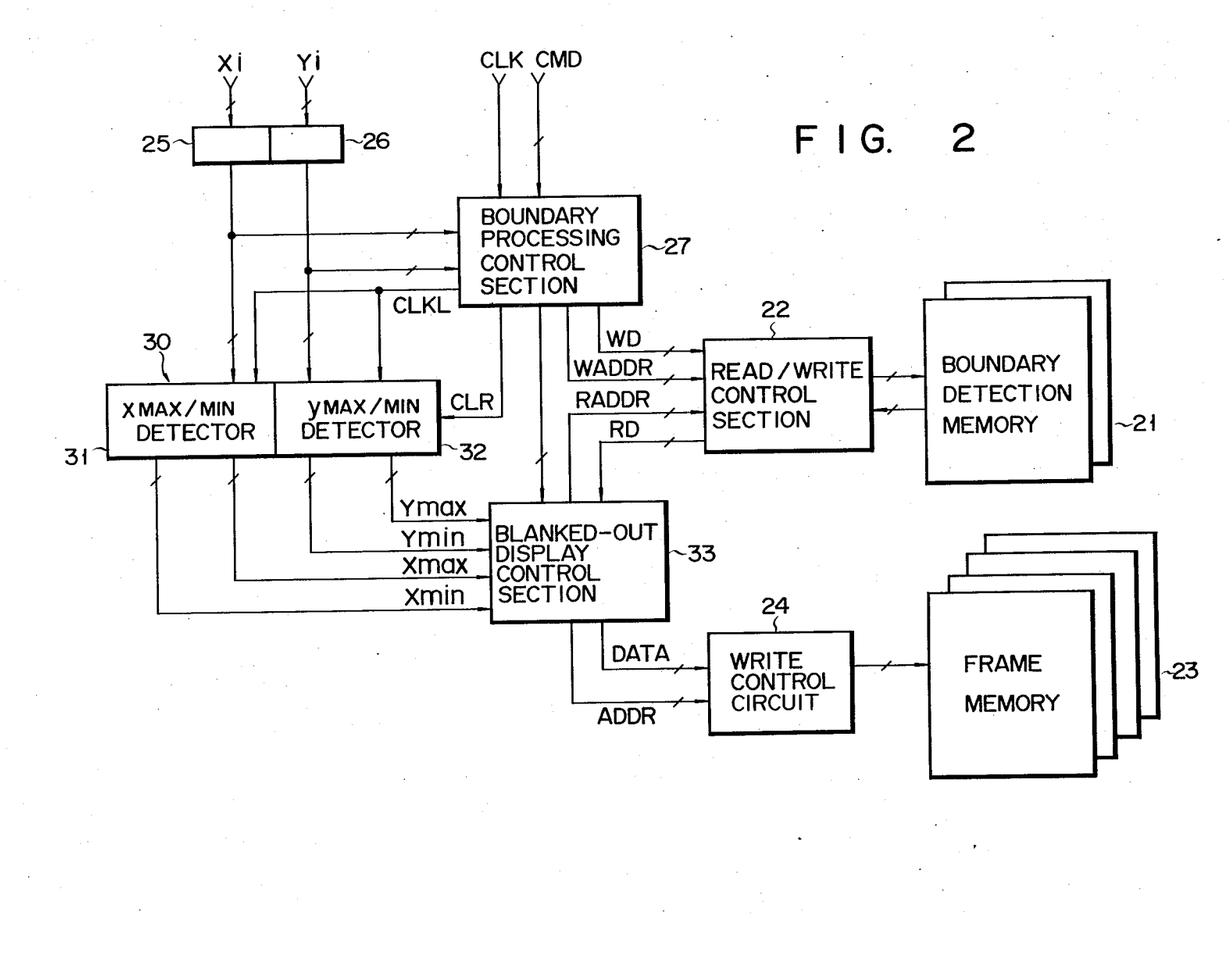
FIG. 2 is a block diagram showing a boundary detection target region designating circuit according to an embodiment of the present invention.

FIG. 2 shows the arrangement of a graphic display apparatus according to an embodiment of the present invention. Referring to FIG. 2, boundary detection memory 21 stores all the two-dimensional figures to be boundaries of target regions of figure blanking out processing. Read/write access of memory 21 is performed by read/write control section 22. Frame memory 23 stores image data. Write control of frame memory 23 is performed by write control circuit 24. Vertex coordinate registers 25 and 26 hold x and y coordinates Xi and Yi of a vertex of a boundary. Boundary processing control section 27 performs boundary processing necessary for figure blanking out processing. Boundary detection target region designating circuit 30 designates a minimum region (minimum boundary detection target region) as a boundary detection target in boundary detection of a blanking out processing region. Circuit 30 has x maximum/minimum detector 31 for detecting maximum x coordinate Xmax and minimum x coordinate Xmin of a minimum boundary detection target region, and y maximum/minimum detector 32 for detecting maximum y coordinate Ymax and minimum y coordinate Ymin of the target region. Blanked-out display control section 33 performs boundary detection in accordance with a designation from circuit 30, and writes a blanked-out figure in frame memory 23 in accordance with the detection result. Note that in FIG. 2, a microprocessor for controlling the entire graphic display apparatus and a display monitor for displaying a figure written in frame memory 23 are omitted.

Figure 3:
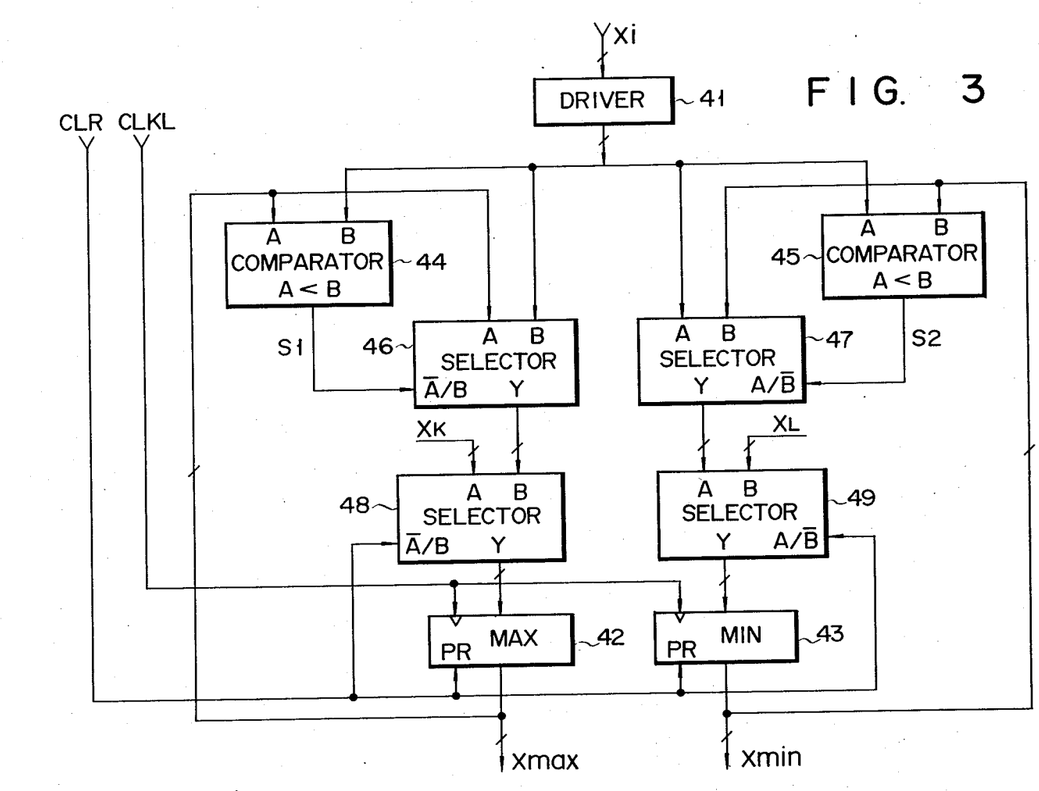
FIG. 3 is a block diagram of an x maximum/minimum detector shown in FIG. 2.

FIG. 3 shows the arrangement of x maximum/minimum detector 31. Referring to FIG. 3, driver 41 receives vertex coordinate Xi held in vertex coordinate register 25. Maximum value register 42 provides maximum x coordinate Xmax of the minimum boundary detection target region. Minimum value register 43 provides minimum x coordinate Xmin of the minimum boundary detection target region. Each of registers 42 and 43 has a preset terminal (PR) and a clock terminal at which signals CLR and CLKL output from control section 27 are supplied. Comparator 44 compares the outputs from driver 41 and register 42. Comparator 45 compares the outputs from driver 41 and register 43. Selector 46 selects one of the outputs from driver 41 and register 42 in accordance with signal S1 as the comparison result of comparator 44. Selector 47 selects one of the outputs from driver 41 and register 43 in accordance with signal S2 as the comparison result of comparator 45. Selector 48 selects a possible minimum x coordinate, e.g., minimum x coordinate XK of a possible display region, and the output from selector 46 in accordance with signal CLR. Selector 49 selects a possible maximum x coordinate, e.g., maximum x coordinate XL of the possible display region, and the output from selector 47 in accordance with signal CLR. The outputs from selectors 48 and 49 are supplied to registers 42 and 43, respectively.

Note that y maximum/minimum detector 32 has the same circuit configuration as that of detector 31.

The operation of the embodiment of the present invention shown in FIGS. 2 and 3 will be described with reference to FIGS. 4A through 4H.

Figure 4A:
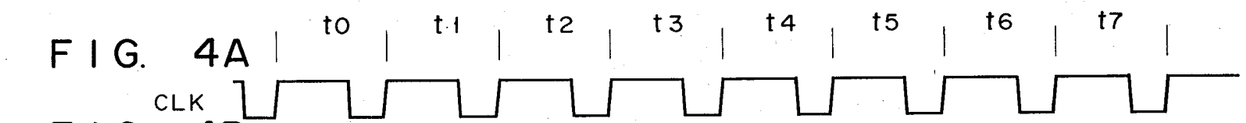

It is assumed that command signal CMD for requesting boundary write processing prior to blanking out processing is output from a microprocessor (not shown). Command signal CMD is supplied to control section 27, as shown in FIG. 2. Upon request of boundary write processing by command signal CMD, control section 27 outputs signal CLR synchronous with a clock signal supplied thereto in cycle t0, as shown in FIG. 4A. Signal CLR is supplied to detectors 31 and 32 of circuit 30.

Figure 4B:
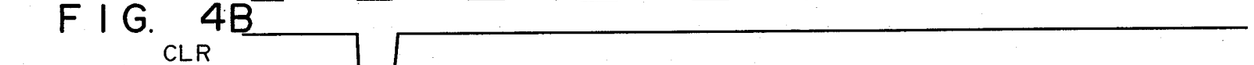

Signal CLR supplied to detector 31 is transferred to selection control terminals $\overline{A}/B$ and $A/\overline{B}$ of selectors 48 and 49, and preset terminals PR of registers 42 and 43. Selector 48 selects minimum x coordinate XK of the possible display region and outputs it to register 42 for an active (LOW level) interval of signal CLR (corresponding to cycle t0), as shown in FIG. 4B. As a result, minimum x coordinate XK is initially set in register 42 in response to the leading edge of signal CLR (i.e., at the end of cycle t0). Meanwhile, the selector 49 selects maximum x coordinate XL of the possible display region and outputs it to register 43 during an active (logic "0") interval of signal CLR (i.e., during cycle t0). As a result, maximum x coordinate XL is initially set in register 43 in response to the leading edge of signal CLR (i.e., at the end of cycle t0).

Figure 4C:
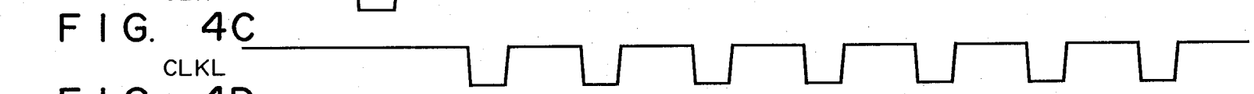
Figures 4D, 4E:
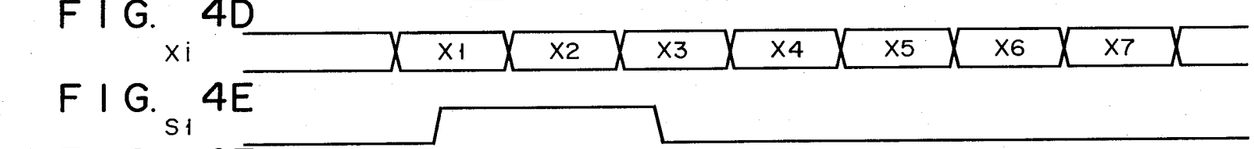
Figure 4F:
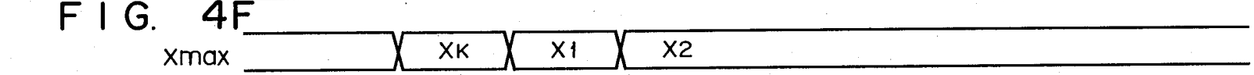
Figure 4G:
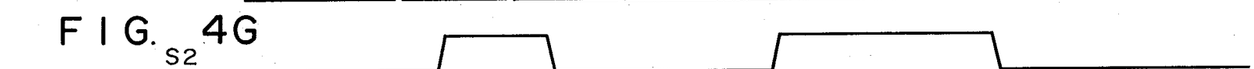
Figure 4H:
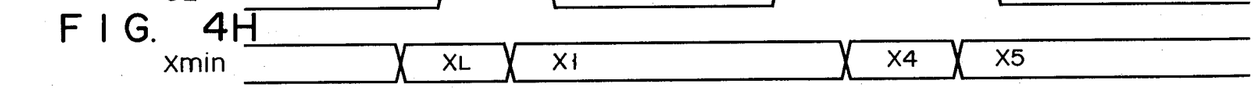

When cycle t0 ends, coordinates Xi and Yi of a vertex of a boundary are sequentially loaded to registers 25 and 26 for each following cycle. In this embodiment, coordinates corresponding to starting point P1, points P2, P3, ... of FIG. 11 and starting point Q1, points Q2, Q3, ... of FIG. 12 shown in FIG. 1 are loaded to registers 25 and 26 in the order mentioned. When vertex coordinates are supplied to registers 25 and 26, command signal CMD is supplied to control section 27. At this time, if the vertex coordinates correspond to starting points of closed figures, e.g., vertexes P1 and Q1 of FIGS. 11 and 12 shown in FIG. 1, command signal CMD indicates a "move" command for moving to the corresponding points. If the vertex coordinates correspond to points other than the starting points, e.g., vertexes P2 through P5 and Q2 through Q4 of FIGS. 11 and 12 shown in FIG. 1, signal CMD indicates a "draw" command for drawing straight lines to the corresponding points. When control section 27 indicates the "move" or "draw" command, control section 27 outputs signal CLKL synchronous with clock signal CLK, as shown in FIG. 4C. Signal CLKL is supplied to detectors 31 and 32 in circuit 30. Detectors 31 and 32 also receive vertex coordinates Xi and Yi loaded to registers 25 and 26.

X coordinates Xi of the vertex supplied to detector 31 is supplied to B inputs of comparator 44 and selector 46 and A inputs of comparator 45 and selector 47. A inputs of comparator 44 and selector 46 receive the output from register 42 (during cycle t1, minimum x coordinate XK), and B inputs of comparator 45 and selector 47 receive the output from register 43 (during cycle t1, maximum x coordinate XL). Comparators 44 and 45 compare the A and B inputs, and if A <B, they output HIG-level signal S1 and S2, respectively. Signals S1 and S2 from comparators 44 and 45 are supplied to the selection control terminals of selectors 46 and 47, respectively.

If signal S1 from comparator 44 is at HIGH level, i.e., if new coordinate Xi is larger than the output of register 42, selector 46 selects the content at the B input, i.e., coordinate Xi. If signal S1 is at LOW level, selector 46 selects the content at the A input, i.e., the output of register 42. The output from selector 46 is supplied to selector 48. Selector 48 selects the output of selector 46 during cycle t1 and thereafter in which signal CLR is again at HIGH level. Thee output from selector 48 is supplied to register 42, and is loaded to register 42 in response to the leading edge of signal CLKL. Therefore, the content of register 42 is updated to Xi only when new coordinate Xi is larger than the content held in register 42.

If signal S2 from comparator 45 is at HIGH level, i.e., if new coordinate Xi is smaller than the output from register 43, selector 47 selects the content at the A input, i.e., coordinate Xi. If signal S2 is at LOW level, selector 47 selects the content at the B input, i.e., the output from register 43. The output from selector 47 is supplied to selector 49. Selector 49 selects the output from selector 47 during cycle t1 and thereafter in which signal CLR is again at HIGH level. The output from selector 49 is supplied to register 43, and is loaded to register 43 in response to the leading edge of signal CKL. Therefore, the content of register 43 is updated to Xi only when new coordinate Xi is smaller than the content held in register 42.

The above operation is performed for all the vertexes (in FIG. 1, P1 through P5 and Q1 through Q4), and registers 42 and 43 can store a minimum rectangular region including all the boundaries of figure blanking out processing target regions, i.e., maximum x coordinate Xmax and minimum x coordinate Xmin of a minimum boundary detection target region. These coordinates Xmax ans Xmin are supplied to blanked-out display control section 33. In y maximum/minmum detector 32, maximum y coordinate Ymax and minimum y coordinate Ymin of the minimum boundary detection target region are obtained in the same manner as in detector 31. These coordinates Ymax and Ymin are supplied to control section 33.

Vertex coordinates Xi and Yi loaded to registers 25 and 26 are also supplied to boundary processing control section 27. Control section 27 writes point arrays approximating lines connecting respective vertexes in memory 21 through control section 22 in accordance with vertex coordinates Xi and Yi of a boundary supplied from registers 25 and 26 for each cycle and "move" or "draw" command CMD. When the above operation is made for all the vertexes of the boundaries (in FIG. 1, P1 through P5 and Q1 through Q4), all the two dimensional figures (in FIG. 1, FIGS. 11 and 12) to be boundaries of figure blanking out processing target regions are written in memory 21.

After all the above-mentioned boundary write operations are completed, command signal CMD commanding start of blanking out processing is sent from the microprocessor to control section 27. Control section 27 transfers the blanking out start command from the microprocessor to control section 33. Control section 33 executes boundary detection processing using a rectangular region stored in memory 21 (the region of rectangle 13, in FIG. 1) defined by maximum coordinates Xmax and Ymax and minimum coordinates Xmin and Ymin supplied from circuit 30 as the boundary detection target region while read accessing in the scan line direction. Control section 33 writes a blanked-out figure in frame memory 23 in accordance with the detection result.

Figure 5:
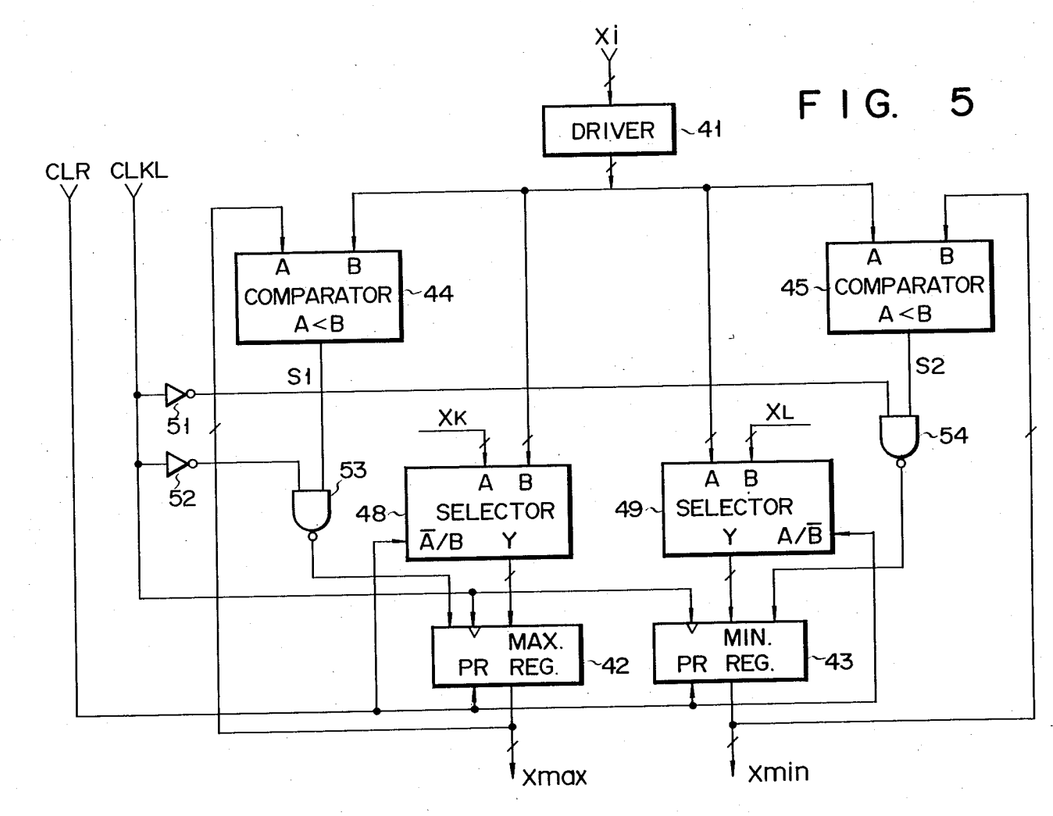
FIG. 5 is a block diagram showing a boundary detection target region designating circuit according to another embodiment of the present invention.

FIG. 5 is a block diagram showing another embodiment of the present invention. In the embodiment shown in FIG. 3, the load operation of registers 42 and 43 is performed in response to signal CLKL. In the embodiment shown in FIG. 5, an output signal from comparator 44 is supplied to one input terminal of NAND gate 53, and signal CLKL is inverted by inverter 52 and is supplied to the other input terminal of NAND gate 53. The output signal from NAND gate 53 is supplied to register 42 as a load signal. Similarly, an output signal from comparator 45 is supplied to one input terminal of NAND gate 54 and signal CLKL is inverted by inverter 51 and is supplied to the other input terminal of NAND gate 54. The output signal from NAND gate 54 is supplied to register 43 as a load signal. In this embodiment, only when Xi is selected, the load operation of registers 42 and 43 is performed. In this case, although Xi is continuously supplied to registers 42 and 43, it does not pose any problem (excluding a case wherein XK and XL are initially set, i.e., during a LOW-level interval of signal CLR). In this embodiment, selectors 46 and 47 in the embodiment shown in FIG. 3 can be omitted.

What is claimed is:

1. A graphic display apparatus comprising:
   boundary detection memory means for storing frame data of a figure;
   frame memory means for storing image data for displaying an image on a screen, the image data corresponding to the frame data stored in the boundary detection memory means;
   target region designating means for detecting maximum and minimum vertex coordinate values of the frame data and for generating a minimum rectangular region including the frame data of the figure; and
   blanking-out display control means for detecting the boundary of the frame data in a target region of the boundary detection memory means corresponding to the minimum rectangular region generated according to the maximum and minimum vertex coordinate values detected by the target region designating means, and for blanking-out a region in the frame memory means corresponding to a region surrounded by the frame data in the target region of the boundary detection memory means.

2. A graphic display apparatus according to claim 7, wherein the target region designating means comprises:
   first register means for storing a predetermined minimum vertex coordinate value is set as an initial minimum vertex coordinate value;
   second register means for storing a predetermined maximum vertex coordinate value is set as an initial maximum vertex coordinate value;
   first comparator means for comparing a vertex coordinate value of the frame data with a content of the first register;
   first updating means for, when the first comparator means detects that the vertex coordinate value is larger than the content of the first register means, updating the content of the first register means to be the vertex coordinate value;
   second comparator means for comparing a vertex coordinate value of the frame data with a content of the second register means; and
   second updating means for, when the second comparator means detects that the vertex coordinate value is smaller than the content of the second register means, updating the content of the second register means to be the vertex coordinate value, wherein the contents of the first and second register means indicate the maximum and minimum vertex coordinate values for generating the minimum rectangular region after comparison of all the vertex coordinate values of the frame data is completed.

3. A graphic display apparatus according to claim 2, wherein the first updating means comprises a first selector which receives the vertex coordinate and the content of the first register means as input signals and an output signal from the first comparator means as a selection signal, and which selectively outputs the vertex coordinate when it is detected that the vertex coordinate is larger than the content of the first register means; and
   a second selector which receives the output signal from the first selector and the maximum x coordinate as input signals and a preset signal supplied from an external device as a selection signal, and which outputs the minimum x coordinate when the preset signal is a first value and outputs the output signal from the first selector to the first register means when the preset signal is a second value.

4. A graphic display apparatus according to claim 2, wherein the second updating means comprises a third selector which receives the vertex coordinate and the content of the second register means as input signals and an output signal from the second comparator means as a selection signal, and which selectively outputs the vertex coordinate when it is detected that the vertex coordinate is smaller than the content of the second register means; and a fourth selector which receives an output signal from the third selector and the maximum x coordinate as input signals and a preset signal supplied from an external device as a selection signal, and which outputs the maximum x coordinate when the preset signal is a first value and outputs the output signal from the third selector to the second register means when the preset signal is a second value.

5. A graphic display apparatus according to claim 2, wherein the first updating means comprises a first selector which receives the vertex coordinate and the minimum x coordinate as input signals and a preset signal supplied from an external device as a selection signal, and which outputs the minimum x coordinate when the preset signal is a first value and outputs the vertex coordinate when the preset signal is a second value;

a second selector which receives the vertex coordinate and the maximum x coordinate as input signals and the preset signal supplied from the external device as a selection signal, and which outputs the maximum x coordinate when the preset signal is a first value and outputs the vertex coordinate when the preset value is a second value;

a first gate which receives the output signal from the first comparator means and an updating signal supplied from an external device; and which outputs the updating signal to the first register means so as to update the content of the first register to be the vertex coordinate when the output signal from the first comparator means indicates that the vertex coordinate is larger than the content of the first register means and the updating signal is a significant signal; and a second gate which receives the output signal from the second comparator means and the updating signal supplied from the external device, and which outputs the updating signal to the second register means so as to update the content of the second register means to be the vertex coordinate when the output signal from the second comparator means indicates that the vertex coordinate is smaller than the content of the second register means and the updating signl is a significant signal.

6. A graphic display apparatus according to claim 5, wherein the updating signal is supplied from the external device in the case of movement to a corresponding point or when a straight line is drawn from a preceding point to a corresponding point.

7. A graphic display apparatus according to claim 2, wherein the first register means is a maximum value register in which a minimum vertex coordinate value is set as the initial vertex coordinate value and the second register means is a minimum value register in which a maximum vertex coordinate value is set as the initial vertex coordinate value.

* * * * *

UNITED STATES PATENT AND TRADEMARK OFFICE
CERTIFICATE OF CORRECTION

PATENT NO. : 4,823,282
DATED : April 18, 1989
INVENTOR(S) : NOBUHIKO YAMAGAMI

It is certified that error appears in the above-identified patent and that said Letters Patent is hereby corrected as shown below:

Claim 2, column 6, line 20: change "Claim 7" to --Claim 1--.

Claim 5, column 8, line 18: change "signl" to --signal--.

Signed and Sealed this

Tenth Day of April, 1990

Attest:

HARRY F. MANBECK, JR.

*Attesting Officer*  *Commissioner of Patents and Trademarks*